United States Patent
Sakai

(10) Patent No.: US 8,523,177 B2
(45) Date of Patent: Sep. 3, 2013

(54) CONVEYING APPARATUS

(75) Inventor: Shigeto Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/546,258

(22) Filed: Jul. 11, 2012

(65) Prior Publication Data

US 2013/0043642 A1 Feb. 21, 2013

(30) Foreign Application Priority Data

Aug. 19, 2011 (JP) .................................. 2011-179780

(51) Int. Cl.
*B65H 7/02* (2006.01)
(52) U.S. Cl.
USPC ................. 271/259; 271/265.01; 271/365.02; 271/256; 271/258.01; 271/258.02
(58) Field of Classification Search
USPC .................. 271/256, 265.01, 265.02, 258.01, 271/258.02, 259
See application file for complete search history.

(56) References Cited

U.S. PATENT DOCUMENTS

| | | | |
|---|---|---|---|
| 2010/0066782 A1* | 3/2010 | Yamamoto et al. | 347/16 |
| 2010/0245449 A1* | 9/2010 | Koga et al. | 347/16 |
| 2010/0252986 A1* | 10/2010 | Nakajima | 271/3.14 |
| 2011/0309571 A1* | 12/2011 | Mizuno et al. | 271/265.01 |

FOREIGN PATENT DOCUMENTS

JP H04-148756 5/1992

* cited by examiner

*Primary Examiner* — Prasad Gokhale
(74) *Attorney, Agent, or Firm* — Fitzpatrick, Cella, Harper & Scinto

(57) ABSTRACT

When continuous-conveying control is executed in a conveying apparatus which can handle various sizes of sheet, a conveying apparatus which can efficiently detect a conveying error by a required minimum conveyed amount or conveying time according to a sheet size is provided. For that purpose, a maximum conveyed amount from start of sheet feeding of the subsequent page to determination to be a sheet-feeding error is set based on a detection result of a rear end portion on a previous page by a PE sensor. The maximum conveyed amount when the rear end portion of the previous page is detected is set smaller than the maximum conveyed amount when not detected.

8 Claims, 6 Drawing Sheets

CONVEYING APPARATUS

BACKGROUND OF THE INVENTION

1. Field of the Invention

The present invention relates to a conveying apparatus provided with a continuous conveying control for a sheet.

2. Description of the Related Art

In an image printing apparatus or an image reading apparatus, a conveying apparatus provided with a feeding portion for feeding sheets one by one into the apparatus from a sheet stocking portion, a conveying portion for conveying the fed sheets to a printing region or a reading region, and a discharge portion for discharging the sheets for which printing or reading has finished is provided. The feeding portion, the conveying portion, and the discharge portion are arranged on a series of paths so that transfer of the sheets among them is performed continuously and processing such as printing or reading is executed without delay.

Many of such conveying apparatuses are provided with a continuous-conveying control configuration for performing discharge of a previous page and feeding of a subsequent page in an interlocking manner for efficient processing of a plurality of sheets. Japanese Patent Laid-Open No. 4-148756 discloses, for example, a conveying control method such that a sensor for detecting a rear end portion of a sheet is arranged on a conveying path of the sheets and the subsequent page is fed at the time when the rear end of the previous page is detected.

With the configuration in which the sensor is arranged on the conveying path as in Japanese Patent Laid-Open No. 4-148756, if slip occurs between the sheet and a conveying roller, for example, the sensor cannot detect the rear end of the sheet forever. Thus, in order to detect such a state as an error, such control is executed that means for measuring a rotation amount of the conveying roller is provided, and if the sensor does not detect the rear end of the sheet even after the conveying roller has been rotated by a predetermined amount, it is determined to be a conveying error. At this time, it is only necessary that the predetermined amount is a sufficient amount to discharge the sheet during processing. In the case of an apparatus for executing processing for sheets with various sizes, the above-described predetermined amount can be set in accordance with the sheet having the largest length among the sheet sizes that can be processed. However, in this case, even if the size of the sheet is small, error determination cannot be made unless the conveying roller is driven by an amount more than necessary and larger than an appropriate conveyed amount for the sheet concerned. That is, even if the continuous-feeding control configuration is provided, long time is consumed for the error determination, and efficient continuous-feeding control cannot be made.

SUMMARY OF THE INVENTION

The present invention was made in view of the above circumstances. Thus, the present invention has an object to provide a conveying apparatus which can efficiently detect a conveying error in required minimum conveyed amount and conveying time according to a sheet size in the case of continuous-feeding control in a conveying apparatus capable of handling sheets having various sizes.

In a first aspect of the present invention, there is provided a conveying apparatus for continuously conveying a plurality of sheets for applying predetermined processing to the sheets, comprising: a conveying unit configured to feed the sheets loaded on a sheet stocking portion one by one, to convey the sheets along a conveying path, and to discharge the sheets; a conveyed amount measuring unit configured to measure a conveyed amount of the sheet by the conveying unit; a processing portion installed in the conveying path of the conveying unit and configured to execute the predetermined processing to the conveyed sheet; a detecting unit installed at an upstream position from the processing portion in the conveying path and configured to detect a leading end portion and a rear end portion of the sheet; and a control portion configured to determine a conveying error of the conveying unit and to control the conveying unit based on the conveyed amount measured by the conveyed amount measuring unit and a detection result by the detecting unit, wherein if the detecting unit does not detect the leading end of a sheet even after the conveyed amount from start of feeding of said sheet obtained from the conveyed amount measuring unit exceeds a predetermined amount, the control unit determines to be the conveying error and if the detecting unit detects the rear end portion of a sheet for the previous page, the control portion sets the predetermined amount smaller than the amount if the rear end portion is not detected.

Further features of the present invention will become apparent from the following description of exemplary embodiments (with reference to the attached drawings).

DESCRIPTION OF THE EMBODIMENTS

Figure 1:
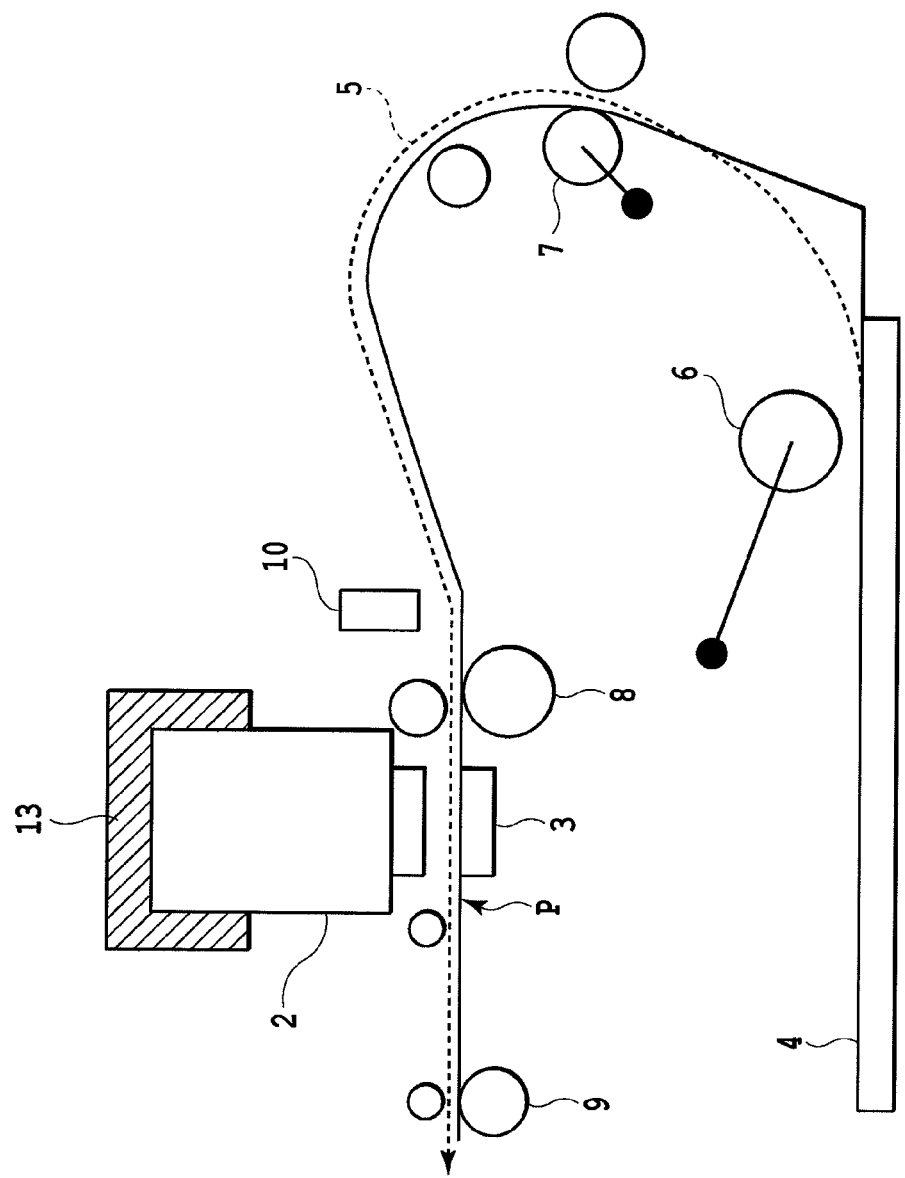
FIG. 1 is an outline diagram of a conveying apparatus which can be used in the present invention.

FIG. 1 is an outline diagram of a conveying apparatus which can be used in the present invention. Here, a printing apparatus provided with a printing head 2 which discharges ink and printing an image on a conveyed sheet is exemplified.

Embodiment 1

In this embodiment, a sheet feeding portion mainly includes a sheet stocking portion 4, a sheet feeding roller 6, and separating means, not shown, composed of a separation pad, a separation claw, a separation bank and the like. With respect to the uppermost sheet loaded on the sheet stocking portion 4, the sheet feeding roller 6 is rotated in a pressure contact state and the separating means acts so as to retain the second sheet and below on the sheet stocking g portion 4 so that the single uppermost sheet loaded on the sheet stocking portion 4 is fed into the apparatus.

When the leading end of the separated sheet reaches the conveying roller 7, the sheet is conveyed along a conveying path 5 by the conveying roller 7, an LF roller 8, and a discharge roller 9 after that and discharged to the outside of the apparatus in the end. On the upstream position in the conveying direction of the LF roller 8, a PE sensor 10 for detecting the leading end or a rear end of the sheet is disposed. Moreover, a printing portion (processing portion) applying printing processing is disposed in the middle between the LF roller 8 and the discharge roller 9.

The printing portion mainly includes a printing head 2 which discharges ink toward the sheet, a platen 3 which supports the sheet from below the conveying path for maintaining smoothness of the sheet during printing, a carriage 13 moving in the perpendicular direction in the figure while the printing head 2 is mounted and the like. The printing head 2 mounted on the carriage 13 discharges ink in accordance with image data while moving together with the carriage 13.

Figure 2:
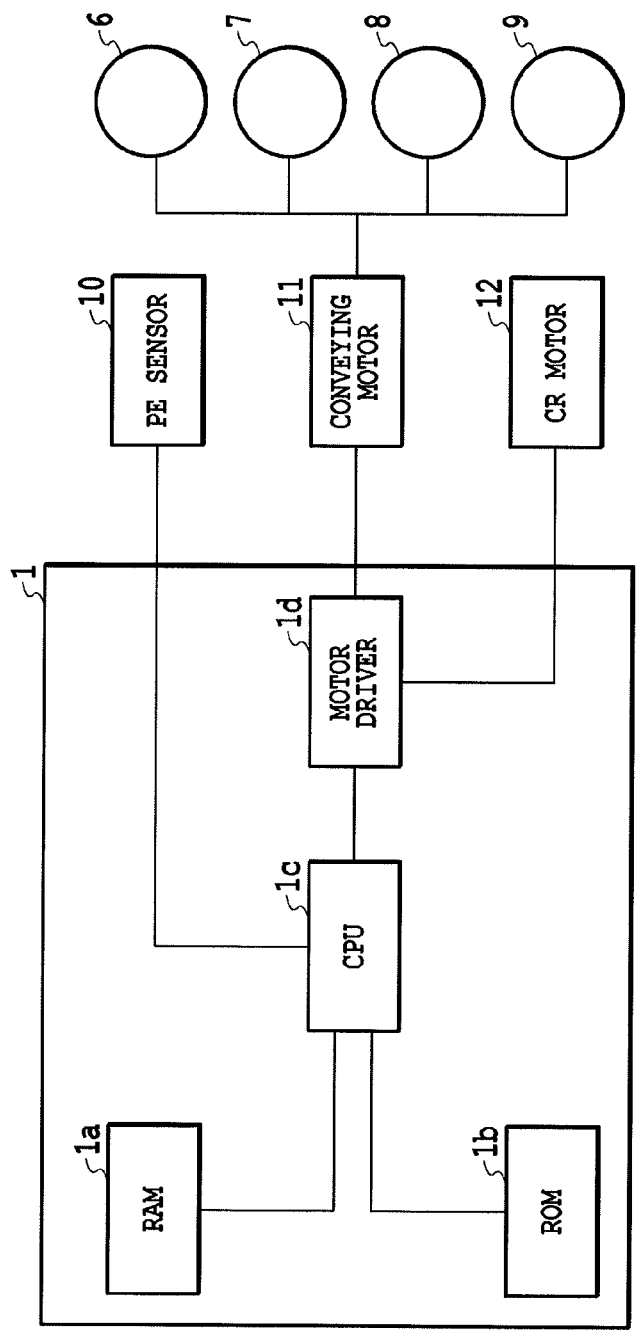
FIG. 2 is a block diagram for explaining a configuration of control relating to conveying.

FIG. 2 is a block diagram for explaining a configuration of control relating to conveying in the conveying apparatus of this embodiment. A control portion 1 executes control of the entire conveying apparatus and includes a ROM 1*b* storing a control program, a motor driving table and a driving parameter and the like, a RAM 1*a* storing a temporary constant, and a CPU 1*c* executing control calculations.

The CPU 1*c* receives a detect signal from the PE sensor 10 and executes driving control of a conveying motor 11 and a CR motor 12 through a motor driver 1*d*. The conveying motor 11 is a motor for driving the feeding roller 6, the conveying roller 7, the LF roller 8, and the discharge roller 9 described in FIG. 1. In this embodiment, the LF roller 8 and the discharge roller 9 have the rotating directions thereof switched in accordance with the rotating direction of the conveying motor 11. On the other hand, the feeding roller 6 and the conveying roller 7 are rotated only in the direction for conveying the sheet from the upstream to the downstream regardless of the rotating direction of the conveying motor 11. The printing apparatus of this embodiment is provided with a configuration for measuring a rotation amount of the conveying motor 11 so that a rotation amount of each roller and hence, an assumed conveyed amount of the sheet corresponding to that can be measured from the measured rotation number.

On the other hand, the CR motor 12 is a motor for reciprocally moving the carriage 13 on which the printing head 2 is mounted.

The printing apparatus of this embodiment described above is assumed to be provided with a continuous-feeding control function for performing continuous printing. Determination on single-page printing or continuous printing may be made in any manner but some of the methods will be illustrated below.

For example, the CPU 1*c* analyzes image data stored in the RAM 1*a*, checks whether or not there is image data for the page subsequent to the page being currently printed, and can determine that the printing is continuous if there is the image data for the subsequent page. In a form in which printing is performed by a command from a host device connected externally, the number of pages can be obtained by a header of the received command or the like. If information on the number of pages cannot be directly obtained, the control portion 1 can request information on presence of the subsequent page from the host device.

The "sheet alignment processing" executed by the control portion 1 if continuous printing is set, that is, conveying processing so that the second sheet and after are fed and arranged at a position to start printing by the printing head will be described below. Here, the printing start position indicates a position of a sheet in the conveying path capable of the first printing scanning by the printing head 2 and a position where the leading end of the sheet is arranged at P in FIG. 1 in this embodiment. Moreover, a sheet conveying distance to the printing start position after detection of the leading end of the sheet by the PE sensor 10, that is, a distance from immediately below the PE sensor 10 to P is referred to as P_Stop.

Moreover, a conveyed amount required for the sheet to be discharged from detection of the rear end of the sheet by the PE sensor 10 is referred to as End LF and a conveyed amount from start of feeding of the sheet to detection of the leading end of the sheet by the PE sensor 10 is referred to as PU. Furthermore, a conveyed amount required for the sheet having the maximum length among the sheet sizes that can be processed by the printing apparatus of this embodiment to be discharged from being fed is referred to as Max LF. In this embodiment, the PE sensor 10 is arranged at a position where a relationship of End LF<PU<Max LF holds true.

First, before describing a process of conveying control characterizing this embodiment, the process of "sheet alignment processing" having been used in general will be described by using the printing apparatus of this embodiment explained in FIGS. 1 and 2.

Figure 3:
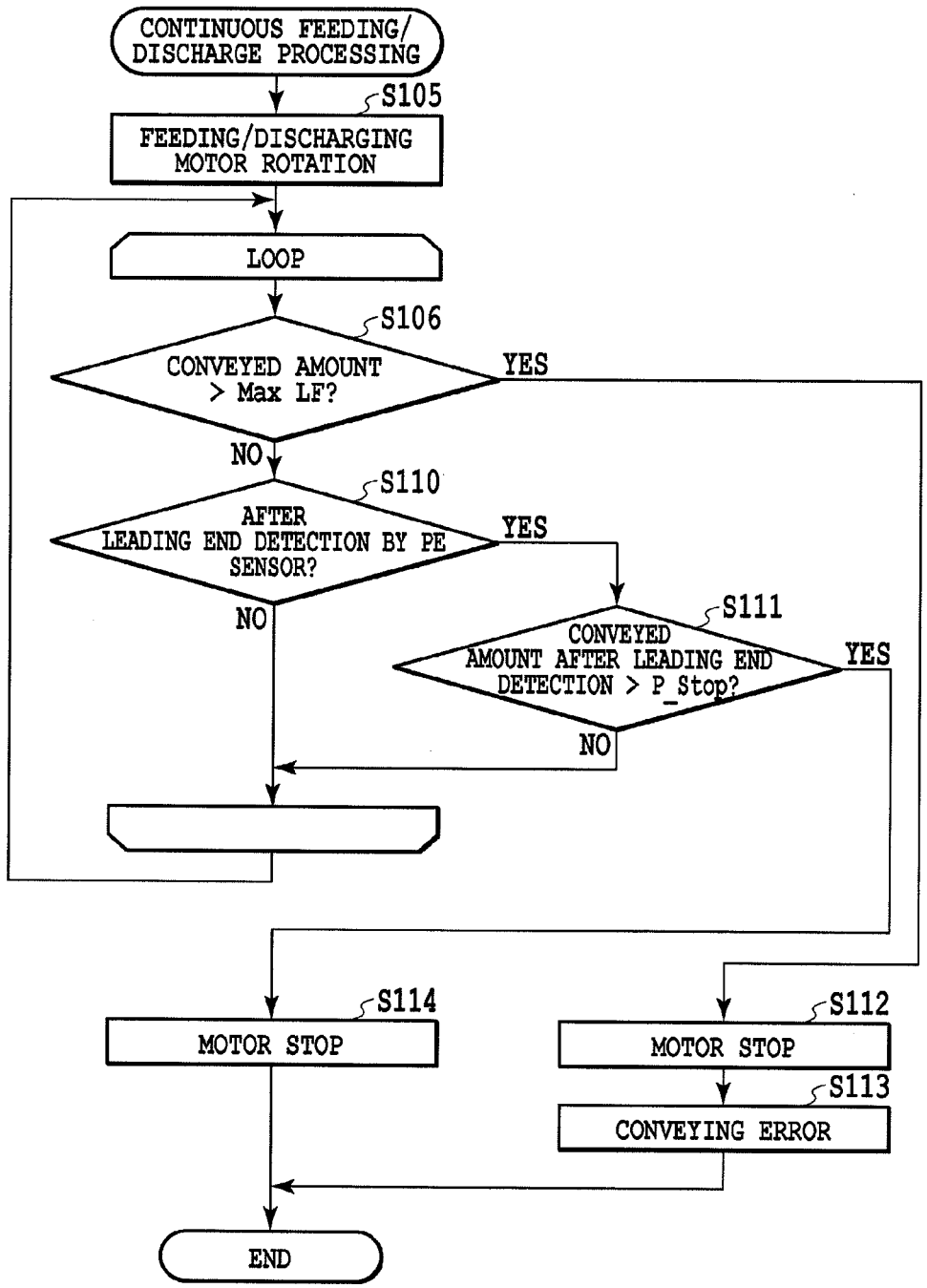
FIG. 3 is a flowchart for explaining conventional general sheet alignment processing.

FIG. 3 is a flowchart for explaining the conventional general sheet alignment processing executed by the CPU 1*c* in the case of continuous printing.

When the sheet alignment processing is started, first, the CPU 1*c* drives the conveying motor 11 at Step S105 and starts feeding of sheets. At this time, counting of the rotation amount of the conveying motor is also started. At Step S106, it is determined whether or not an assumed conveyed amount (conveyed amount not including slip or the like) obtained from the rotation amount of the conveying motor from Step S105 exceeds Max LF. If the assumed conveyed amount has already exceeded Max LF, it is determined to be a conveying error, driving of the conveying motor is stopped at Step S112, and the conveying error is notified to a user at Step S113. On the other hand, if it is determined that the assumed conveyed amount has not exceeded Max LF yet at Step S106, the routine proceeds to Step S110.

At Step S110, the CPU 1*c* determines whether or not the PE sensor has detected the leading end of the sheet. If it is determined that the leading end has not been detected yet, the routine returns to Step S106 while the conveying operation is continued. On the other hand, if it is determined that the PE sensor 10 has detected the leading end of the sheet, the routine proceeds to Step S111.

At Step S111, it is determined whether the assumed conveyed amount from the time when the PE sensor 10 detected the leading end of the sheet to the current time has exceeded P_Stop or not. If P_Stop has been exceeded, it is determined that the sheet is arranged at the printing start position, the driving of the conveying motor is stopped at Step S114, and this processing is finished. On the other hand, if it is determined at Step S111 that the assumed conveyed amount from the time when the PE sensor 10 detected the leading end of the sheet to the current time has not exceeded P_Stop yet, the routine returns to Step S106 while the conveying operation is continued.

As described above, in the prior-art general sheet alignment processing, conveying of sheets is continued other than the case in which it is determined to be a conveying error at Step S106 or it is determined that the sheet alignment is completed at Step S111.

Figure 4:
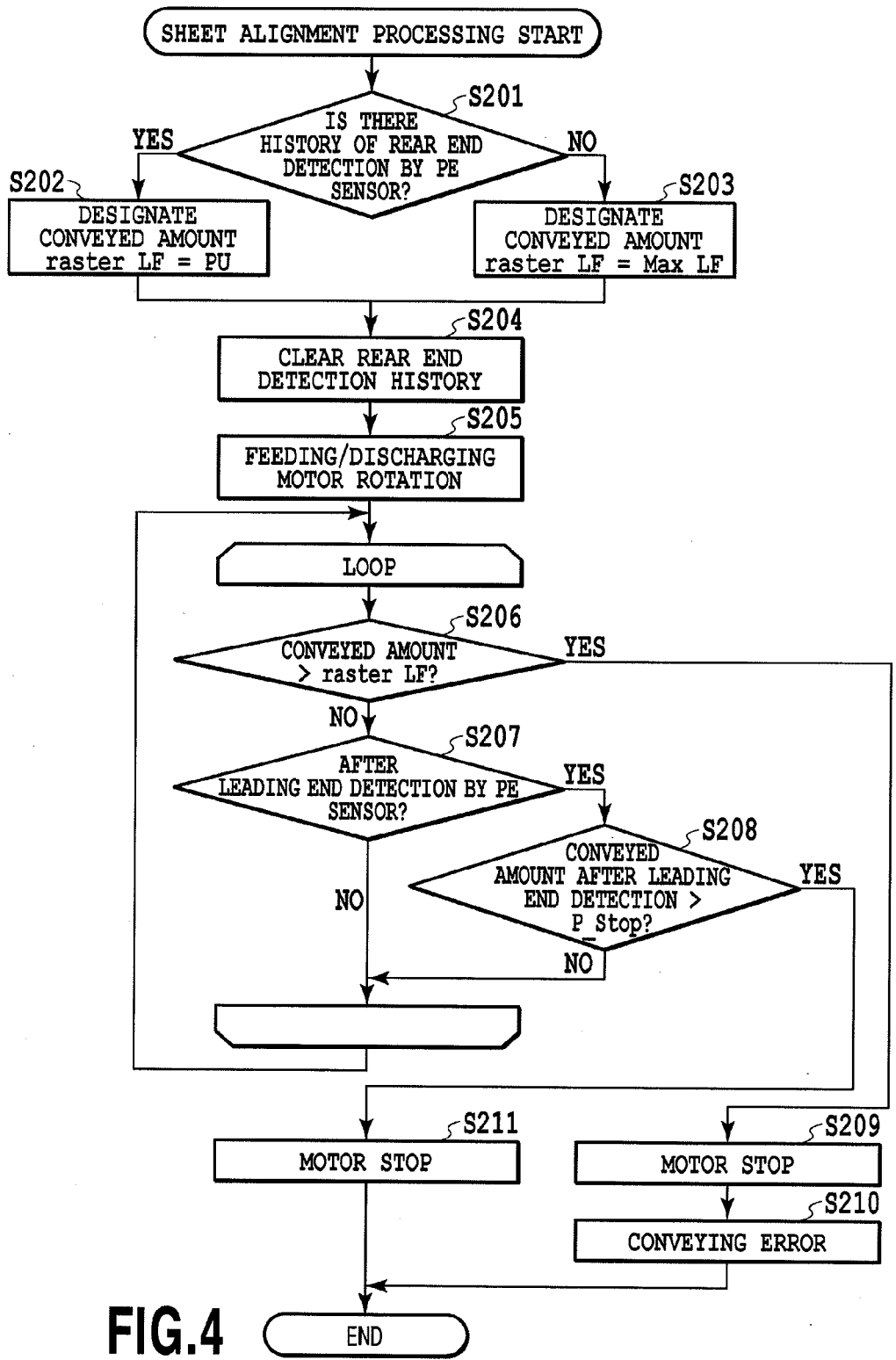
FIG. 4 is a flowchart for explaining sheet alignment processing in Embodiment 1.

FIG. 4 is a flowchart for explaining the sheet alignment processing executed by the CPU 1*c* in this embodiment.

When the sheet alignment processing is started, first, the CPU 1*c* determines at Step S201 whether or not the PE sensor 10 has detected a rear end portion of the previous page by analyzing a detection history of the PE sensor 10 stored in the RAM 1A. If it is determined that the rear end portion of the previous page has been already detected, the routine proceeds to Step S202, while if it is determined that the rear end portion has not been detected yet, the routine proceeds to Step S203.

At Step S202, a maximum conveyed amount "raster LF" in the current sheet alignment processing is set to PU (a conveyed amount from start of feeding of the sheet to detection of the leading end of the sheet by the PE sensor 10). On the other hand, at Step S203, the maximum conveyed amount "raster LF" in the current sheet alignment processing is set to Max LF (a conveyed amount required for the sheet having the maximum length to be discharged from being fed among the sheet sizes that can be processed by the printing apparatus).

At the subsequent Step S204, the detection history of the rear end portion of the previous page checked at Step S201 is cleared, and at Step S205, the conveying motor 11 is driven and feeding of the sheet is started. However, the clearing of the detection history executed at Step S204 is a process for avoiding a state in which a new detection history can no longer be stored at another process, which will be described later, since a capacity for storing the detection history is limited. Thus, if the capacity for storing the detection history is sufficient, the clearing of the detection history as at Step S204 is not necessarily required.

At Step S206, it is determined whether or not an assumed conveyed amount (a convened amount not including slip or the like) obtained from the rotation amount of the conveying motor from Step S204 exceeds the maximum conveyed amount (raster LF) set at Step S202 or S203. If the assumed conveyed amount has already exceeded the maximum conveyed amount, it is determined to be a conveying error, the driving of the conveying motor is stopped at Step S209, and the fact of the conveying error is notified to a user at Step S210. On the other hand, if it is determined at Step S206 that the assumed conveyed amount has not exceeded the maximum conveyed amount yet, the routine proceeds to Step S207.

At Step S207, the CPU 1c determines whether or not the PE sensor 10 has detected a leading end of a sheet. If it is determined that the leading end has not been detected yet, the routine returns to Step S206 while the conveying operation is continued. On the other hand, if it is determined that the PE sensor 10 has detected the leading lend of the sheet, the routine proceeds to Step S208.

At Step S208, it is determined whether or not the assumed conveyed amount from the time when the PE sensor 10 detected the leading end of the sheet to the current time has exceeded P_Stop. If the assumed conveyed amount exceeds P_Stop, it is determined that the sheet has been aligned at a printing start position, the driving of the conveying motor is stopped at Step S211, and this processing is finished. On the other hand, at Step S207, if it is determined that the assumed conveyed amount from the time when the PE sensor 10 detected the leading end of the sheet to the current time has not exceeded P_Stop yet, the routine returns to Step S206 while the conveying operation is continued.

As described above, according to this embodiment, if the rear end of the previous page is detected by the PE sensor, the maximum conveyed amount raster LF for determining the conveying error is not set to the maximum length Max LF of the sheet size but to the conveyed amount PU until the leading end of the sheet is positioned to P.

In this embodiment, if the rear end of the previous page is detected at Step S201, it becomes obvious that the conveyed amount required for the previous page is not more than End LF after that. Moreover, in the printing apparatus of this embodiment, as described above, the relationship of End LF<PU is satisfied. Thus, in continuous-conveying control in which discharge conveying for the previous page and sheet-feeding conveying for the subsequent page are performed at the same time, by performing conveying of PU from the current time, the discharge processing of the previous page and the sheet alignment processing of the subsequent page should be completed in parallel. Conversely, if the leading end of the subsequent page is not detected even after conveying of PU, it can be determined to be a sheet-feeding error at that time.

As described above, according to this embodiment, the value of the maximum conveyed amount "raster LF" is determined based on the detection result of the rear end portion of the previous page by the PE sensor 10. That is, the sheet conveyed amount for determination of the sheet-feeding error is not set to Max LF all the time but it is set to PU sufficiently smaller than Max LF only if the rear end of the previous page is detected by the PE sensor. As a result, time required for determination of the sheet-feeding error (conveying error) can be made shorter than before.

Embodiment 2

Figure 5:
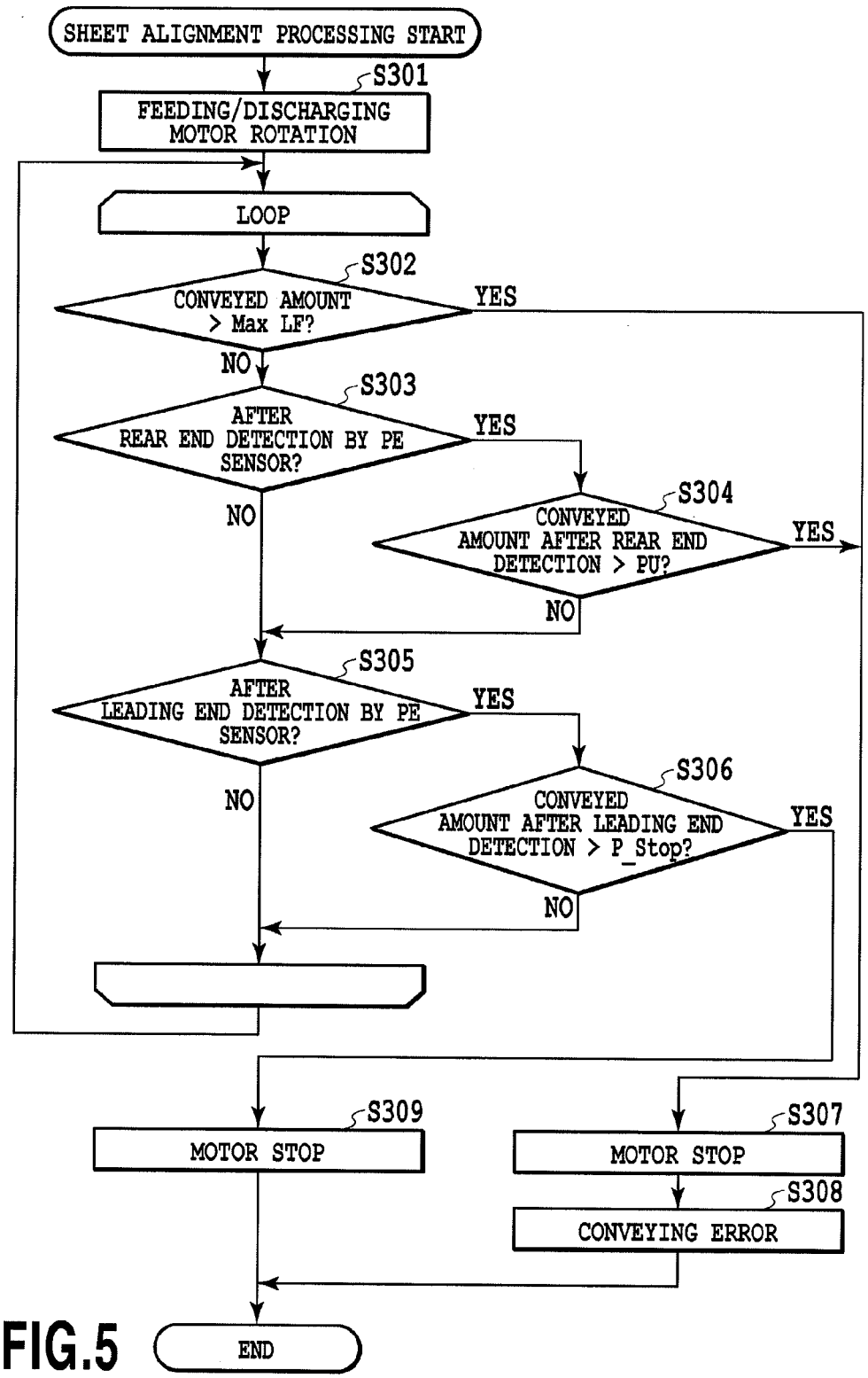
FIG. 5 is a flowchart for explaining sheet alignment processing in Embodiment 2.

FIG. 5 is a flowchart for explaining the sheet alignment processing executed by the CPU 1c in an embodiment 2.

When the sheet alignment processing is started, first, the CPU 1c drives the conveying motor 11 at Step S301 and starts feeding of sheets. At Step S302, it is determined whether or not the assumed conveyed amount obtained from the rotation amount of the conveying motor exceeds Max LF. If the assumed conveyed amount has already exceeded Max LF, it is determined to be a conveying error, the driving of the conveying motor is stopped at Step S307, and the fact of the conveying error is notified to a user at Step S308. On the other hand, at Step S302, if it is determined that the assumed conveyed amount has not exceeded Max LF yet, the routine proceeds to Step S303.

At Step S303, the CPU 1c determines whether or not the PE sensor 10 has detected the rear end portion of the previous page. If it is determined that the rear end portion has been detected, the routine proceeds to Step S304, while if it is determined that the rear end portion has not been detected yet, the routine proceeds to Step S305.

At Step S304, it is determined whether or not the conveyed amount from the time when the rear end portion of the previous page is determined to be detected at Step S303 to the current time has exceeded PU. If PU is exceeded, it is determined to be a sheet-feeding error, the driving of the conveying motor is stopped at Step S307, and the fact of the conveying error is notified to a user at Step S308. If it is determined that PU has not been exceeded yet, the routine proceeds to Step S305.

At Step S305, it is determined whether or not the PE sensor 10 has detected a leading end portion of the subsequent page. If it is determined that the leading end portion has been detected, the routine proceeds to Step S306, while if it is determined that the leading end portion has not been detected yet, the routine returns to Step S302 while the conveying operation is continued.

At Step S306, it is determined whether or not the conveyed amount from the time when the PE sensor 10 detected the leading end of the sheet to the current time has exceeded P_Stop. If P_Stop has been exceeded, it is determined that the sheet has been aligned at the printing start position, the driving of the conveying motor is stopped at Step S309, and this processing is finished. On the other hand, at Step S306, if it is determined that the assumed conveyed amount from the time when the PE sensor 10 detected the leading end of the sheet to the current time has not exceeded P_Stop yet, the routine returns to Step S302 while the conveying operation is continued.

In this embodiment, too, similarly to the embodiment 1, for the case in which the PE sensor 10 detects the rear end portion, the conveyed amount for determining the sheet-feeding error is set to PU (Step S304). However, in the embodiment 1, the contents of the maximum conveyed amount "raster LF" is determined based on a determination result before the rotation of the conveying motor is started (S201). On the other hand, in this embodiment, at the time when the PE sensor 10 detects the rear end portion after the rotation of the conveying motor is started (S303), the conveyed amount for determining the sheet-feeding error is set to PU (S304). Thus, according to this embodiment, as compared with the embodiment 1, a possibility that the sheet conveyed amount for determination of the sheet-feeding error is set not to Max LF but to PU increases, and further saving of time required for the determination of the sheet-feeding error can be expected.

Figure 6:
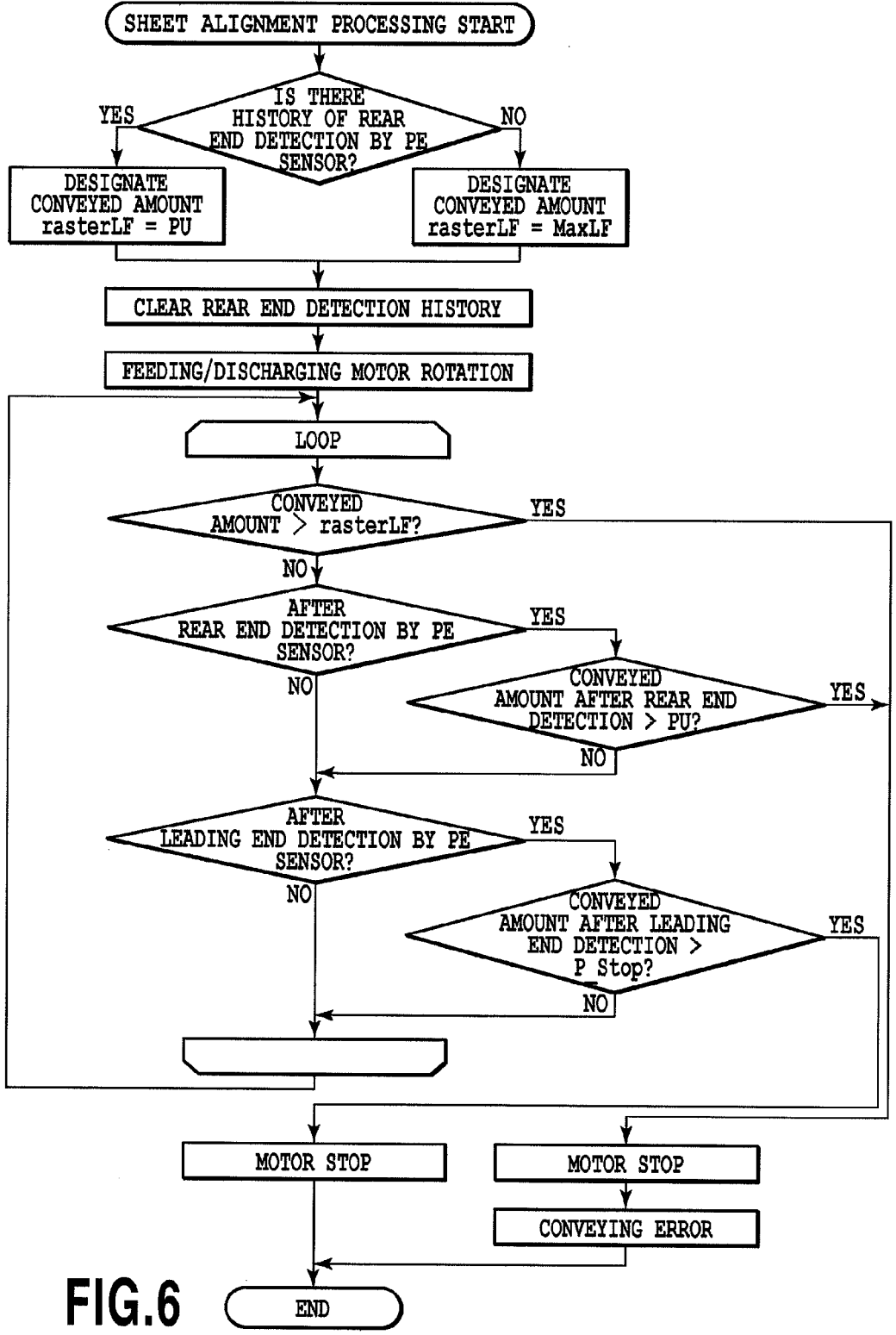
FIG. 6 is a flowchart for explaining another embodiment of sheet alignment processing in the present invention.

At this time, it may be configured such that timing to set the maximum conveyed amount to PU based on the detection result of the rear end portion can be set both before the start of rotation of the conveying motor as in the embodiment 1 and during the rotation of the conveying motor as in the embodiment 2. In this case, the sheet alignment control can be executed in accordance with the flowchart illustrated in FIG. 6. By configuring as above, even if the sheet-feeding processing of the subsequent page is too early or too late with respect to the sheet-discharge processing of the previous page, time required for determination of the sheet-feeding error can be reduced more reliably.

In the above-described embodiments, the position of the PE sensor in the conveying path is not limited to the position as in FIG. 1. The PE sensor may be installed at any position as long as it is closer to the upstream position from the printing start position P and appropriate PU, End LF and P_Stop are set in accordance with the installed position.

Moreover, in the above-described embodiments, the conveyed amount required for the sheet having the maximum length among the sheet sizes that can be processed to be discharged from being fed is set to Max LF, but the present invention is not limited to such configuration. For example, by providing detecting means of the sheet size in the apparatus main body or by transmitting a command for designating the sheet size from a host apparatus so that the sheet size to be conveyed can be obtained in advance, Max LF in an appropriate amount according to the sheet size can be set. In this case, conveying more than necessary for detecting the conveying error is further reduced, and time required for determination of the conveying error can be further reduced.

Moreover, the stop of the motor performed at Step S209 in FIG. 4 and Step S307 in FIG. 5 is not necessarily a required process, but error notification can be given while rotation of the motor is continued.

Moreover, in the above-described embodiments, the conveyed amount measurement configuration in which the assumed conveyed amount of the sheet is measured by measuring the rotation amount of the conveying motor is prepared, but the configuration for obtaining the assumed conveyed amount does not have to be such. For example, such a configuration may be adopted that a slit rotating with a roller is attached to each roller and the rotation amount of the roller and the assumed conveyed amount are calculated from the number of passages through the slit. Moreover, the configuration may be such that the assumed conveyed amount is calculated not by rotation amount of the motor or the roller but by counting a pulse signal for driving the motor or the like.

Furthermore, in the above-described embodiments, a serial printing apparatus was used as an example of the conveying apparatus, but the present invention is not limited to such configurations. The present invention also functions effectively in an image reading device in which an image reading element may be provided instead of the printing head so as to obtain image information on the sheet. Moreover, the present invention is also effective in a form in which the sheet is continuously conveyed with respect to the printing head or the reading element fixed in the device. Whatever processing is to be executed for the sheet, the effect of the present invention can be sufficiently exerted in a form in which a plurality of sheets are continuously conveyed for executing predetermined processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179780, filed Aug. 19, 2011, which is hereby incorporated by reference herein in its entirety.

What is claimed is:

1. A conveying apparatus for continuously conveying a plurality of sheets for applying predetermined processing to the sheets, comprising:
   a conveying unit configured to feed the sheets loaded on a sheet stocking portion one by one, to convey the sheets along a conveying path, and to discharge the sheets;
   a conveyed amount measuring unit configured to measure a conveyed amount of the sheet by the conveying unit;
   a processing portion installed in the conveying path of the conveying unit and configured to execute the predetermined processing to the conveyed sheet;
   a detecting unit installed at an upstream position from the processing portion in the conveying path and configured to detect a leading end portion and a rear end portion of the sheet; and
   a control portion configured to determine a conveying error of the conveying unit and to control the conveying unit based on the conveyed amount measured by the conveyed amount measuring unit and a detection result by the detecting unit,
   wherein if the detecting unit does not detect the leading end of a sheet even after the conveyed amount from start of feeding of said sheet obtained from the conveyed amount measuring unit exceeds a predetermined amount, the control unit determines to be the conveying error and if the detecting unit detects the rear end portion of a sheet for the previous page, the control portion sets the predetermined amount smaller than the amount if the rear end portion is not detected.

2. The conveying apparatus according to claim 1, wherein if the detecting unit detects the rear end of the sheet of the previous page, the predetermined amount is set to a conveyed amount corresponding to the amount from start of feeding of the sheet to detection of the leading end of the sheet by the detecting unit, and
   if the detecting unit does not detect the rear end of the sheet on the previous page, the predetermined amount is set to a conveyed amount required for the sheet having a maximum length, among the sheet sizes that can be processed by the conveying apparatus, to be discharged from being fed.

3. The conveying apparatus according to claim 1, wherein the control portion sets the predetermined amount based on the determination whether or not the detecting unit has detected the rear end of the sheet on the previous page before the feeding of the sheet is started.

4. The conveying apparatus according to claim 1, wherein the control portion sets the predetermined amount based on the determination whether or not the detecting unit has detected the rear end of the sheet on the previous page after the feeding of the sheet is started.

5. The conveying apparatus according to claim 1, wherein the conveying unit has a sheet-feeding roller for feeding sheets loaded on the sheet stocking portion one by one, a conveying roller for conveying the sheet along the conveying path, a discharge roller for discharging the sheet from the apparatus, and a conveying motor for rotating the sheet-feeding roller, conveying roller, and discharge roller, and the conveyed amount measuring unit measures a conveyed amount of the sheet by a rotation amount of the conveying motor.

6. The conveying apparatus according to claim 1, wherein the conveying unit has a sheet-feeding roller for feeding sheets loaded on the sheet stocking portion one by one, a conveying roller for conveying the sheet along the conveying path, a discharge roller for discharging the sheet from the apparatus, and a conveying motor for rotating the sheet-feeding roller, conveying roller, and discharge roller, and the conveyed amount measuring unit measures a conveyed amount of the sheet by the rotation amounts of the sheet-feeding roller, conveying roller, and discharge roller.

7. The conveying apparatus according to claim 1, wherein the predetermined processing is printing processing for printing on a sheet.

8. The conveying apparatus according to claim 1, wherein the predetermined processing is reading processing of an image printed on a sheet.

* * * * *